March 31, 1970  W. B. HANSEL  3,503,713
VALVE ARRANGEMENT FOR REACTORS
Filed Feb. 26, 1968  2 Sheets-Sheet 2
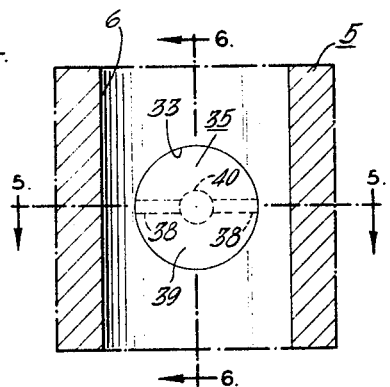
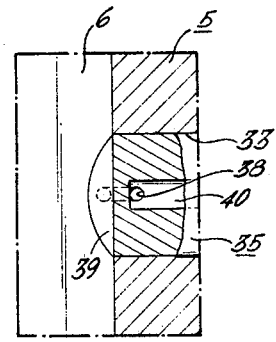
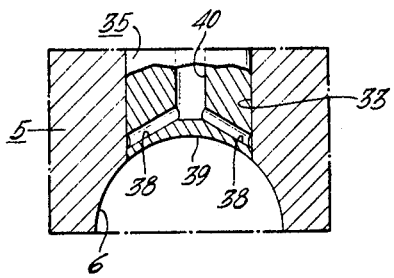
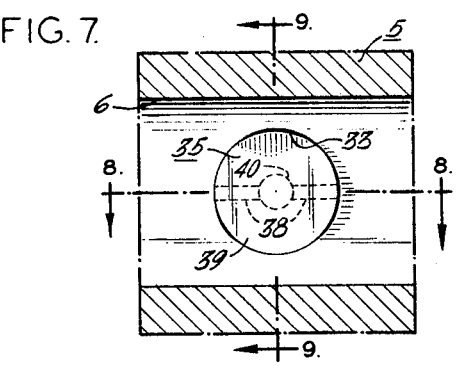
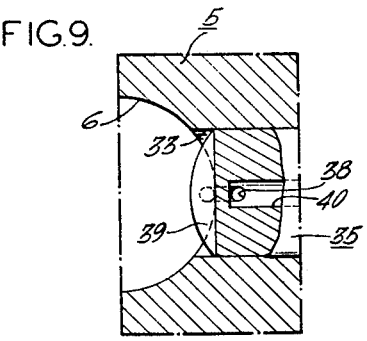
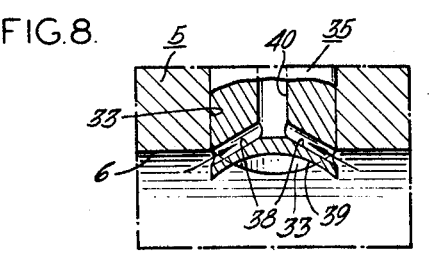
INVENTOR:
WILLIAM B. HANSEL
BY Donald R. Johnson
ATTY.

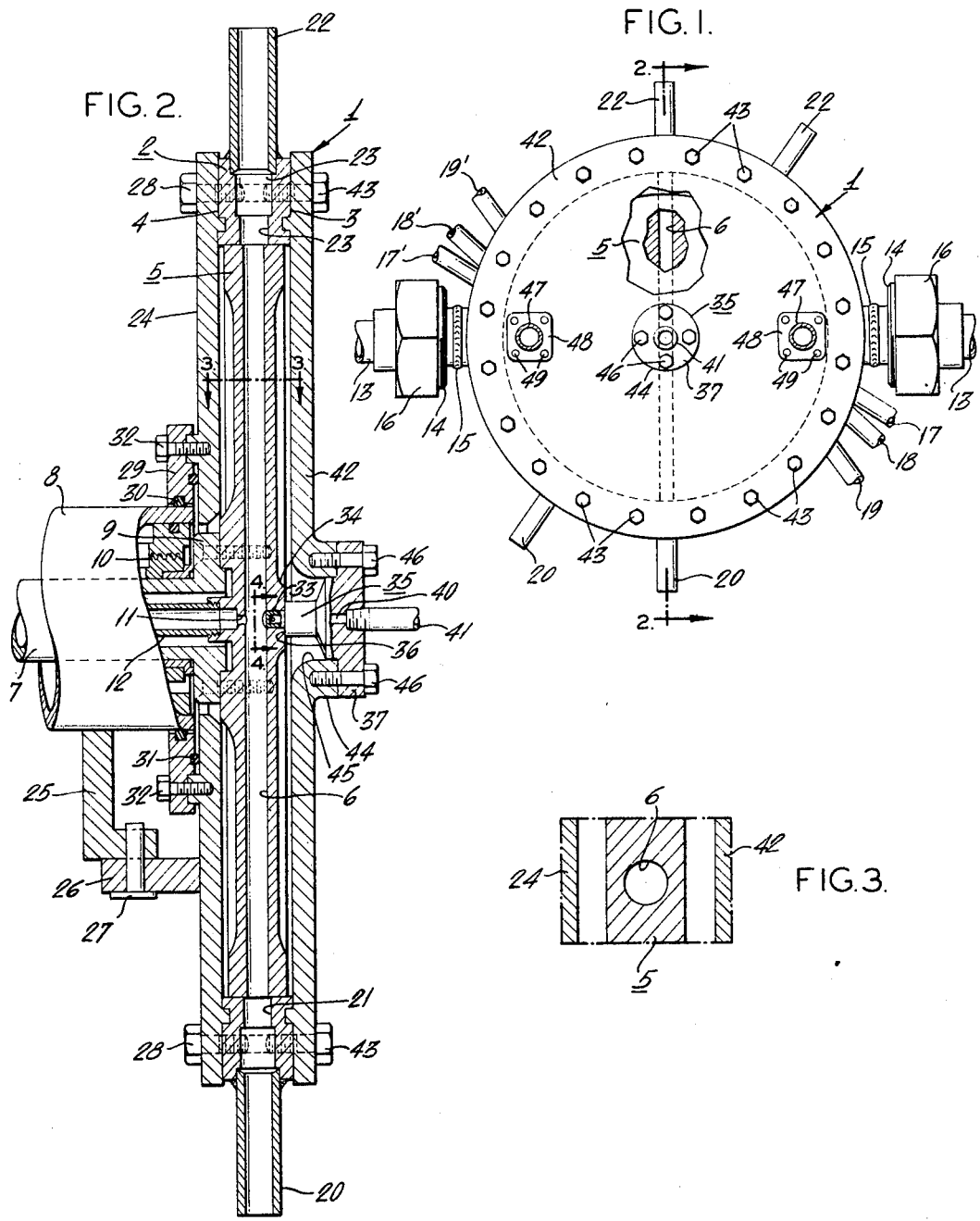

United States Patent Office 3,503,713
Patented Mar. 31, 1970

3,503,713
VALVE ARRANGEMENT FOR REACTORS
William B. Hansel, Media, Pa., assignor to Sun Oil Company, Philadelphia, Pa., a corporation of New Jersey
Filed Feb. 26, 1968, Ser. No. 708,326
Int. Cl. B01j 3/02; C07c 11/24
U.S. Cl. 23—284
9 Claims

ABSTRACT OF THE DISCLOSURE

For valving at the center of the length of an elongated shock tube of circular cross section which is arranged for rotation about a central axis transverse to the longitudinal axis of the tube, a hole is drilled through the tube wall along this axis, and a stationary valve stem is mounted in this hole. This stem has a port opening in its outer cylindrical wall which communicates at its inner end with a channel in the stem, and the inner end face of the stem matches the curvature of the shock tube wall.

---

This invention relates to a valve arrangement useful in wave reactors.

Recently, there has been developed a device, termed a wave reactor, for carrying out chemical reactions of the endothermic type. In this device, chemical reactions are carried out by subjecting the reactants to one or more mechanical shock waves, thereby to produce a high temperature in such reactants for a very short period of time. A wave reactor which utilizes shock waves is disclosed in my prior Patent No. 3,254,960, dated June 7, 1966. The said patent also discloses a typical process employing a wave reactor.

Speaking somewhat generally, the wave reactor disclosed in said patent includes a disc-like rotor which is mounted for rotation about an axis, e.g. a horizontal axis, this rotor having therein a straight passage (shock tube) whose longitudinal axis extends transversely to the axis of rotation of the rotor and along a diameter of the disc. A stationary port ring surrounds the disc, this port ring being concentric with the disc and having inlets and outlets therein which come into communication with the channel as the latter is rotated; these inlets and outlets serve to feed certain gases to and from the shock tube or passage.

As described in said prior patent, in a wave reactor of the type described both ends of the elongated shock tube are simultaneously exposed to a high pressure driving gas, creating in the tube two shock waves which emanate from the tube ends and proceed toward the center of the tube. Such shock waves eventually meet in the middle of the tube and are reflected. When the two compression waves (which have entered respective ends of the tube as shock waves) meet at the center (or middle) of the tube, a momentary peak pressure of about 40.4 atmospheres is reached; the pressure in the reflected wave is about 20.5 atmospheres. Thus, the impact area of the compression waves is located at the center of the tube, i.e., midway between the tube ends. The process gas (reactant material), which has been charged into the shock tube prior to the admission of the driving gas, is converted to product gas mainly in this region of the tube due to the high pressure or impact thereat, so that the purity of the converted or product gas is very high in this region. It is highly desirable to withdraw this high-purity product (produced in the central region of the shock tube) from the reactor, so that it can be utilized. Also, flow patterns set up when shock waves are simultaneously created at both ends of the tube are such that they are symmetrical about the center of the tube; due to this symmetry, a more representative sample of the product gas is available at the center of the tube.

An object of this invention, therefore, is to provide, for a wave reactor employing a rotating shock tube, a novel construction whereby the converted product may be removed from the central region of the tube.

Another object is to provide a novel rotary valve arrangement for wave reactors.

A further object is to provide a valving arrangement, for the removal of gases from a rotating shock tube, which does not involve any net change in the volume inside the shock tube, as the latter rotates.

The objects of this invention are accomplished, briefly, in the following manner: A disc rotor which is arranged for rotation about an axis is provided with a cylindrical passage extending along a diameter of the disc and transversely to the axis of rotation of the rotor. The passage is arranged to operate as a shock tube, and for this purpose a stationary port ring surrounds the disc, in order to feed gases to and from the shock tube (passage). A cylindrical bore, whose longitudinal axis coincides with the axis of rotation of the disc, extends from the interior of the shock tube to the exterior of the disc, and in this bore is mounted a fixed valve stem which has therein a central longitudinal channel and, communicating with the inner end of this channel, a port which opens into the cylindrical surface of the stem, near the inner end face thereof. The inner end of the valve stem has a concave curvature which matches the curvature of the wall of the shock tube passage. As the disc rotates, the port of the valve stem comes into communication with the interior of the shock tube passage, thereby to convey gases to or from the tube by way of the port and the valve stem channel.

A detailed description of the invention follows, taken in conjunction with the accompanying drawings, wherein:

FIG. 1 is a front elevation of a wave reactor utilizing the invention;

FIG. 2 is a vertical section of the reactor of FIG. 1 taken on line 2—2 thereof;

FIG. 3 is a partial horizontal section taken on line 3—3 of FIG. 2;

FIG. 4 is a fragmentary section taken on line 4—4 of FIG. 2;

FIG. 5 is a transverse section taken on line 5—5 of FIG. 4;

FIG. 6 is a longitudinal section taken on line 6—6 of FIG. 4;

FIG. 7 is a sectional view similar to FIG. 4, but showing the disc in another rotational position;

FIG. 8 is a longitudinal section taken on line 8—8 of FIG. 7; and

FIG. 9 is a transverse section taken on line 9—9 of FIG. 7.

It has been found that it is possible to convert natural gas (methane) into acetylene, or mixtures of natural gas and nitrogen into hydrogen cyanide and acetylene, by heating the reagents quickly to temperatures above 3200° F., the heating to be almost immediately followed by cooling to a temperature not substantially greater than 1600° F., the cooling rate being comparable to the heating rate. More specifically, a mixture of nitrogen and methane can be converted to a mixture consisting of acetylene, hydrogen cyanide, hydrogen, nitrogen, and methane, at a low power plus heat cost and with good yields of acetylene, hydrogen cyanide, and by-product hydrogen.

The required heating and cooling may be conveniently effected in a shock tube, the heating being effected by a shock wave set up in the tube by a driving gas. The gas or mixture of gases which is acted upon in the shock tube may be termed the reagents, or a process gas, or a reactant mixture, or a charge gas, or a reactant material, or a process mixture.

The construction of a wave reactor according to the invention will now be described, first with reference to FIGS. 1–3. The wave reactor 1 is of generally circular outer configuration. A stationary port ring 2 is mounted in a position wherein its longitudinal axis extends substantially horizontally, and its two parallel annular faces (to wit, its front and rear faces 3 and 4, respectively; see FIG. 2) lie in parallel vertical planes. By way of example, port ring 2 may have a thickness in the axial direction of one inch, an I.D. of twelve inches, and an O.D. of 14½ inches.

A disc 5, having an outer diameter such as to fit very closely (with a minimum running clearance) within port ring 2, is mounted for rotation at a high angular velocity (e.g., 9600 r.p.m.) within ring 2. If the disc is twelve inches in diameter, this means that the lineal speed at the outer edge of the disc is about 30,000 feet per minute. This disc is mounted for rotation about a horizontal axis which coincides with the longitudinal axis of port ring 2, so that the outer cylindrical surface of the disc rotates just inside the inner cylindrical surface of the stationary port ring.

Disc 5 has therein a straight passage 6 of circular cross section (see FIG. 3), whose longitudinal axis lies along a diameter of the disc. The longitudinal axis of the cylindrical passage 6 thus lies in a substantially vertical plane, transverse to the horizontal axis of rotation of the disc-like rotor 5, and the axis of rotation of the rotor passes through the midpoint of the length of passage 6. The passage 6 may have a diameter of about ¼-inch, by way of example, and provides a straight elongated shock tube close to twelve inches in length. Passage 6 is open at both ends, and the ends of this passage terminate closely adjacent the inner cylindrical surface of the port ring 2, as shown in FIG. 2. As the disc 5 rotates in essentially a vertical plane, the ends of passage 6 come into communication with various conduits, pipes, and nozzles connected to port ring 2, which will be further referred to hereinafter.

A hollow horizontally-extending shaft 7 (see FIG. 2) is mounted for rotation within a fixed housing 8. Housing 8, which may be cylindrical with its axis extending horizontally, provides a support for the entire wave reactor, and is rigidly secured to a suitable bracket or mount (not shown) which rests on the floor, or other supporting surface. Shaft 7 is arranged to be rotated at a high rate of speed (e.g., 9600 r.p.m.) by a motor (not shown), which is coupled by means of a suitable mechanical coupling (also not shown) to the end of shaft 7 opposite to disc 5. An integral collar 9, on one end of shaft 7, is suitably bolted to disc 5, coupling disc 5 to shaft 7, thereby to cause rotation of this disc at the same high rate of speed as shaft 7.

Although not illustrated in FIG. 2, it is to be understood that a journal bearing is provided within housing 8, near the disc end of this housing, for journaling shaft 7 within the housing. Also, a combined journal and thrust bearing is provided for shaft 7 within housing 8, at the end of this housing adjacent the shaft driving means.

The shock tube 6, being formed in disc 5 and thus being an integral portion thereof, rotates at the same high rate of speed as this disc and shaft 7. It may be seen that the disc 5 rotates essentially in a vertical plane, about the horizontal axis provided by shaft 7. The shock tube 6, of course, rotates in this same plane. A labyrinth seal (a portion of which is illustrated at 10) is used around shaft 7. In addition, other seals (not shown) may be utilized, to enhance the overall sealing around shaft 7.

For pressure measurement purposes, an aperture 11 may be provided in the rear wall of passage 6, centrally of the length thereof, and in this aperture a pressure transducer (not shown) may be inserted, to measure the pressure at the center of the shock tube as the latter rotates. The transducer is so constructed that it in effect fills in the aperture 11, and forms a continuation of the tube wall, for gas flow in the shock tube. The pressure transducer leads may be taken off through a conduit 12 which extends through the bore of hollow shaft 7 and one end of which threads into a threaded fitting provided at the center of the rear face of disc 5. Conduit 12, and the pressure transducer also rotate with disc 5.

Port ring 2 has therein a pair of diametrically-opposite, radially-extending apertures which are centered on the respective opposite ends of its central horizontal diameter; in each of these apertures there is mounted a respective driving gas (e.g., hydrogen) supply nozzle whose outer end is visible at 13. These nozzles have at their inner ends an appropriate cross section (appropriate for the circular cross section of shock tube 6), they open into the interior of the port ring 2, and they are cut off at their inner ends on a twelve-inch diameter arc, to match the curvature of the I.D. of ring 2. Toward their outer ends, each of the nozzles 13 is provided with a respective mechanical assembly which enables the nozzles to be adjusted radially with respect to the port ring, in their respective apertures, over a small range (such as 0.01 inch). Such assemblies are not shown completely herein, since they form no part of the present invention; they are disclosed in detail in my Patent No. 3,263,645, dated Aug. 2, 1966. Such assemblies may each include an externally-threaded flange 14 secured as by welding at 15 to the outer face of ring 2, and a housing 16 having female threads at one end thereof which mate with the male threads of flange 14.

The outer ends of nozzles 13 are coupled to respective lines or pipes (not shown), which in turn extend to a reservoir of hydrogen (driving gas) at a suitably high temperature and pressure. Thus, by means of the nozzles 13, the driving gas is fed to diametrically-opposite areas of the interior of ring 2, that is, to diametrically-opposite sides of the wave reactor.

Adjacent the right-hand one of the nozzle apertures, in the clockwise direction (when looking at the wave reactor from the front thereof, as in FIG. 1), a line 17 is sealed more or less radially into port ring 2, this line communicating with the outer end of a continuous port or passageway (not shown) whose inner end opens into the interior of ring 2. Line 17 serves as a first-stage coupling for removing driving gas from the interior of ring 2, at one side of the wave reactor (to wit, the right-hand side in FIG. 1).

Diametrically opposite to line 17, a similar line 17' is sealed more or less radially into the port ring, this latter line communicating with the outer end of a continuous port or passageway whose inner end opens into the interior of ring 2. Line 17' serves as a first-stage coupling for removing driving gas from the interior of ring 2, at the other side of the wave reactor (to wit, the left-hand side in FIG. 1).

Slightly clockwise from line 17, a line 18 is sealed more or less radially into port ring 2, this line communicating with the outer end of a continuous port or passageway whose inner end opens into the interior of ring 2. Line 18 serves as a second-stage coupling for removing driving gas from the interior of ring 2, at one side of the wave reactor (to wit, the right-hand side in FIG. 1).

Diametrically opposite to line 18, a similar line 18' is sealed more or less radially into the port ring, this latter line communicating with the outer end of a continuous port or passageway whose inner end opens into the interior of ring 2. Line 18' serves as a second-stage coupling for removing driving gas from the interior of ring 2, at the other side of the wave reactor (to wit, the left-hand side in FIG. 1).

Slightly clockwise from line 18, a line 19 is sealed more or less radially into port ring 2, this line communicating with the outer end of a continuous port or passageway whose inner end opens into the interior of ring 2. Line 19 serves as a third-stage coupling for removing driving gas from the interior of ring 2, at one side of the wave reactor (to wit, the right-hand side in FIG. 1).

Diametrically opposite to line 19, a similar line 19' is sealed more or less radially into the port ring, this latter line communicating with the outer end of a continuous port or passageway whose inner end opens into the interior of ring 2. Line 19' serves as a third-stage coupling for removing driving gas from the interior of ring 2, at the other side of the wave reactor (to wit, the left-hand side in FIG. 1).

The outer or remote ends of the line 17–19 and 17'–19' are connected to certain units (not shown) whereby the driving gas removed from the reactor via these lines may be processed for reuse in the driving gas nozzles 13, as more particularly disclosed in my 1960 patent previously mentioned, or in Patent No. 3,307,918, dated Mar. 7, 1967.

According to the present invention, there is provided a rotary porting arrangement or rotary valve arrangement which may be used for removing or collecting the converted process gases (i.e., the product gases) from the shock tube 6 of the wave reactor or wave machine 1; the said arrangement will be described in detail hereinafter. The product gases are removed or extracted from the shock tube utilizing an opening located midway between the tube ends, and this extraction takes place in effect after the ends of the tube have traveled (during the rotation of the tube in a clockwise direction, viewed as in FIG. 1) past the ports (in ring 2) to which the respective lines 19 and 19' are coupled.

Two reactant material feed conduits 20, which are manifolded together at their outer ends and to a source of supply (not shown) of the gaseous reactant material or charge material (e.g., a mixture of nitrogen and methane), are sealed radially into the port ring 2 at angularly-spaced locations; the inner ends of these two conduits both communicate through the ring with a common arcuately-elongated groove 21 which is cut into the inner cylindrical surface of ring 2. The aforementioned groove may begin at a point considerably clockwise (viewed as in FIG. 1) from the port associated with line 19, and may extend in a clockwise direction around to a point spaced considerably in the counterclockwise direction from the aperture for the left-hand nozzle 13. The detailed construction of a reactant material feed conduit arrangement of the type described is disclosed, for example, in the 1918 patent, mentioned previously.

Two scavenging conduits 22, which are manifolded together at their outer ends and to an evacuator (not shown), are sealed radially into the port ring 2 at angularly-spaced locations; the inner ends of these two conduits both communicate through the ring with a common arcuately-elongated groove 23 which is cut into the inner cylindrical surface of ring 2. The aforementioned groove may begin at a point considerably clockwise (viewed as in FIG. 1) from the port associated with line 19', and may extend in a clockwise direction around to a point spaced considerably in the counterclockwise direction from the aperture for the right-hand nozzle 13. Grooves 23 and 21 may have the same angular length, and may be diametrically opposite each other; the two conduits 22 may be diametrically opposite respective ones of the two conduits 20. The detailed construction of a scavenging or purging conduit arrangement of the type described is disclosed, for example, in the 1918 patent previously mentioned.

A somewhat condensed description of the operation of the wave reactor, as described up to this point, will now be given. Assume that the straight elongated open-ended passage or tube 6 is rotating (at high angular velocity) in the clockwise direction, in the plane of the paper in FIG. 1, and about an axis defined by the longitudinal axis of shaft 7 (which axis is perpendicular to the plane of the paper in FIG. 1). This tube 6 moves past the ports (in ring 2) coupled to the various lines and conduits described in connection with FIG. 1.

As one end of the tube 6 rotates past the counterclockwise end of feed groove 21, fresh charge gas is admitted to the tube, by way of the feed conduits 20 coupled to this groove. At this same time, the other end of the tube or passage 6 is passing groove 23, which leads by way of the scavenging conduits 22 to an evacuator; this causes the new charge gas to push out of the tube the gases left over from the previous cycle of operation, by a scavenging action. In FIG. 1, the shock tube 6 is illustrated in a position wherein it extends vertically; in this position, the two opposite ends of the tube are in communication with grooves 21 and 23, respectively.

When the opposite ends of tube 6 thereafter come into registry with the inner ends of the nozzles 13, both ends of the tube are thereby suddenly connected to the reservoir of high-pressure driving gas, e.g. hydrogen. The hydrogen enters the tube with high velocity from both ends, creating two shock waves which push the process gas (already in the tube) toward the middle. This adiabatic compression compresses the process gas and brings it very rapidly to the reaction temperature, not less than 3200° F. The two shock waves, emanating from the tube ends, eventually meet in the middle and are reflected. When each of the two compression waves (which have entered respective ends of the tube as shock waves) has arrived at its respective end as a reflected wave, the compression process is complete.

After completion of the compression process, the tube contains a charge of process (now product) gas and hydrogen at high pressure, with both tube ends being closed (since, by this time, the ends of the tube have completed their travel past the inner ends of nozzles 13).

Following the compression process, one end of the tube comes into registry with the port associated with line 17 and the other end of the tube comes into registry with the port associated with line 17'; this means that both such ends simultaneously become open to spaces of a pressure below the pressure in the tube. Now, hydrogen begins to flow out of the tube, setting up expansion waves which emanate from the respective ends of the tube and move toward the middle of the tube. The expansion described begins to rapidly reduce the temperature and pressure of the product gas. The two expansion waves, emanating from the two tube ends, eventually meet in the middle and are reflected. When each of the two expansion waves has arrived at its respective tube end as a reflected wave, the first expansion process is complete.

For a more detailed description of the compression and expansion processes previously referred to, reference may be had to my previously-mentioned 1960 patent.

After completion of the first expansion process, the tube 6 contains the original quantity of product gas, plus a fraction of the hydrogen which originally entered the tube; these contents are at a reduced pressure. At this point, both tube ends are closed, the ends of the tube having completed their travel past the ends of the ports associated with lines 17 and 17', respectively.

The expansion process described is repeated two more times, the tube ends being opened each time to spaces of progressively lower pressure (to wit, first the ports associated with lines 18 and 18' and then the ports associated with lines 19 and 19'). Thus, a total of three expansion stages are employed. At the end of the third expansion stage, all the motive or driving hydrogen has left the tube 6.

After the third expansion stage, there is an expansion and discharge process during which the converted gaseous mixture (product mixture) is discharged; this expansion and discharge or extraction takes place from the center of the tube, by way of a rotary valve arrangement to be described hereinafter.

This completes one cycle of operation of the wave reactor, and shortly thereafter a new cycle begins when one end of the tube again rotates past the counterclockwise end of groove 21, and at the same time the other tube end rotates past the counterclockwise end of groove 23. It may thus be seen that there are two complete cycles of operation of the wave reactor per complete or 360° revolution of disc 5.

The admission of new reactant material (via lines 20) into one end of the tube 6 pushes out (via lines 22, coupled to the other end of the tube) the materials remaining therein after the previous cycle of operation, thus providing a scavenging action.

A rear cover plate 24, which is more or less disc-shaped, is secured to the rear face 4 of port ring 2. Cover plate 24 is attached in any suitable manner to housing 8, in order to provide proper support for the principal stationary parts of the wave reactor (such as the port ring 2, etc.). By was of example, three two-piece lugs (one of which is illustrated in FIG. 2) may be provided, one piece 25 of each lug being rigidly secured to housing 8 and the other piece 26 of each lug being rigidly secured to the outer face of plate 24. The two pieces of each matched lug 25, 26 are rigidly secured to each other through a radial drivingly-fitted pin 27.

For securing cover plate 24 to port ring 2, a circular array of longitudinally-extending tapped holes is provided in ring 2. Short bolts 28 pass through plate 24 and thread into respective ones of the aforementioned tapped holes, to secure rear cover plate 24 to port ring 2. Cover plate 24 has a substantially circular opening at its center of a diameter such as to clear the rotating collar 9. It is pointed out that the axial dimension of the flange-like, radially-outer portion of disc 5 is appreciably less than that of port ring 2, so that there is clearance space (for rotation of disc 5) between the inner face of cover plate 24 and the rear face of disc 5. Also, sufficient clearance (for rotation) is of course provided between the radially-outer edge of disc 5 and the radially-inner edge of ring 2.

A seal ring 29 is used to seal the space between the inner end of housing 8 and the outer face of cover plate 24. Ring 29 carries in its inner cylindrical surface a gasket 30 (for example, an O-ring) which provides a seal against the outer cylindrical surface of housing 8, and carries in its inner circular face a gasket 31 (for example, an O-ring) which provides a seal against the outer face of cover plate 24. Seal ring 29 is held in position by a plurality of bolts 32 which pass therethrough and thread into tapped holes provided in cover plate 24.

Refer now to FIGS. 2 and 4–9. According to this invention, a rotary valve arrangement is provided for removing product from the central region of the shock tube or passage 6, this removal being made to occur, on a time basis, following the removal of driving gas through the third-expansion-stage lines 19 and 19'.

A transverse cylindrical bore 33, whose center line lies along the axis of rotation of the disc or rotor 5 (i.e., along an extension of the axis of shaft 7) is provided in disc 5, diametrically opposite aperture 11. Bore 33 is transverse to the longitudinal axis of passage 6, and extends from the exterior of rotor 5 to the interior of passage 6; bore 33 is of course centered at the center of the length of passage 6. The front face of disc 5 is preferably formed with an increased thickness in the vicinity of bore 33, to provide a centrally-located boss 34; a similar annular boss (not numbered) is formed on the rear face of disc 5, to provide a thickened disc portion to which the collar 9 is secured.

A fixed or stationary elongated valve stem 35, which is generally cylindrical in outer configuration, is disposed in the horizontal bore 33. The inner end portion of stem 35 has an O.D. such as to closely match the diameter of bore 33, with just sufficient difference between these two diameters to prevent any seizing. In this connection, it is noted that stem 35 remains stationary while disc 5 (and, hence, the cylindrical wall defining bore 33) rotates. The inner end face 39 of valve stem 35, as may be seen in FIG. 5, is arcuately concave, such as to quite accurately match the curvature of the cylindrical wall of passage 6, at the inner end of bore 33. The length of the inner end portion of stem 35, which fits within bore 33 is equal to the length of this bore; the length of bore 33 is of course the distance (measured horizontally, or parallel to the axis of rotation of the disc) between the outer planar face of disc boss 34 and the cylindrical wall defining passage 6. Just outwardly of the inner end portion of stem 35, this stem has an enlarged-diameter portion the inner end of which forms an inwardly-facing shoulder 36 adapted to rotatingly engage the outer planar face of boss 34. The extreme outer end of valve stem 35 comprises an integral mounting plate 37 which is disc-like in shape.

Stem 35 has therein a pair of cylindrical ports 38 whose outer ends open into the cylindrical outer surface of this stem, at respective diametrically-opposite points thereon closely adjacent to but just rearwardly of the inner end face 39 of the stem. From the cylindrical outer surface of the stem, these ports extend radially inwardly of the stem and also in a direction rearwardly of the stem, so that their axes extend approximately parallel to the curved inner end face 39. The radially-inward ends of ports 38 open into and thus communicate with the inner end of a central longitudinally-extending cylindrical channel 40 in stem 35, the longitudinal axis of channel 40 being collinear with the axis of rotation of disc 5 (and thus being substantially horizontal). The outer end of channel 40 (in mounting plate 37) is threaded, and the threaded end of a pipe 41 screws into these threads. The pipe 41 thus communicates at one end with channel 40 (and also, of course, with ports 38), and the opposite end of this pipe is connected to a suitable product gas container, or product sample container (not shown).

A front cover plate 42, which is more or less disc-shaped, is secured to the front face 3 of port ring 2. The tapped holes, into which bolts 28 extend at the rear face 4 of ring 2, extend entirely through the port ring body, in an axial direction. Short bolts 43 pass through plate 42 and thread into respective ones of these last-mentioned holes, to secure front cover plate 42 to port ring 2.

The front cover plate 42 has a central outwardly-facing boss portion 44 which surrounds a central axial opening 45, the boss portion thus providing an outwardly-facing annular mounting face which lies in a substantially vertical plane.

The outer diameter of mounting plate 37 matches that of the boss 44. Said boss is provided with a circular array of spaced tapped longitudinally-extending holes, and mounting plate 37 (and thus also the stem 35) is secured to boss 44 by a plurality of bolts 46, each of these bolts passing through plate 37 and threading into a respective tapped hole in boss 44. If desired, each of these bolts 46 may pass through a respective arcuately-elongated slot (not shown) provided in plate 37, for enabling a limited amount of angular adjustment of the stem 35 with respect to front cover plate 42 (for a reason which will be explained hereinafter).

As previously described, disc 5 (with its passage or shock tube 6) rotates about its axis of rotation at a high rate of speed, while valve stem 35 remains stationary or fixed in position. FIGS. 4–6 illustrate the rotational position of disc 5 at the time of arrival of the shock wave at the center of the passage or shock tube 6. In this position, the end face 39 of valve stem 35 is aligned with the circular wall defining passage 6; end face 39 is flush with such circular wall, and thus there is no protrusion into the shock tube. The inner ends of the ports 38 are completely closed off from passage 6 at this time by portions of disc 5, since such inner ends are then covered by the cylindrical wall of bore 33. The valve arrangement is then "closed."

As disc 5 rotates sufficiently from the position illustrated in FIGS. 4–6, the inner ends of ports 38 begin to be uncovered, due to the rotation of bore 33 with respect to these ports, bringing the inner ends of the ports in effect beyond the inner end of this bore, and thus bringing these ports into communication with the interior of passage or shock tube 6. When the ports 38 are thus uncovered, gaseous products begin to be removed from the center of the shock tube 6, via ports 38, channel 40, and pipe 41. The arrangement is such that ports 38 are not uncovered (in the manner just described) until after the ends of the shock tube 6 have rotated past the third-stage expansion lines 19 and 19′.

FIGS. 7–9 illustrate the rotational position of the disc when the same has rotated through 90° from the position illustrated in FIGS. 4–6. In FIGS. 7–9, the disc 5 has rotated with respect to valve stem 35 to a position completely opposite to that illustrated in FIGS. 4–6, the position of FIGS. 7–9 being one wherein the inner ends of ports 38 are fully uncovered, and these ports are fully open to the interior of the shock tube 6; at this time, the inner ends of ports 38 are entirely beyond the inner end of bore 33, as may be seen in FIG. 8. The shock tube passage 6 is then open to the maximum possible extent to the "products out" pipe 41. The valve arrangement is now "full open."

It is desired to be pointed out here that, in the device of the present invention, there is no net change in the internal volume of the cylindrical passage (shock tube) 6, as the latter rotates. That is to say, there is no volumetric change in the shock tube, as it rotates. This is so because the increase in volume in tube 6 resulting from the uncovering of a portion of the bore 33, as the disc 5 rotates with respect to valve stem 35, is exactly counterbalanced by the decrease in volume in the tube resulting from the entry of the end portion of the stem 35 into the tube. This is a significant feature of the invention. In addition, since the rotary valve arrangement described is located near the axis of rotation of the disc, where the lineal speed is rather small, difficulties which might arise from high relative rates of movement are avoided.

As disc 5 rotates beyond the position illustrated in FIGS. 7–9, the inner ends of ports 38 begin to be again covered by the wall defining bore 33 (as a result of the rotation of disc bore 33 with respect to these ports), and, when disc 5 has rotated sufficiently from the position illustrated in FIGS. 7–9, the ports 38 are again completely covered or closed off from passage 6. The arrangement is such that the ports 38 are completely closed before the ends of the shock tube 6 come into communication with grooves 21 and 23.

From a consideration of FIGS. 4–9, it may be seen that two complete cycles of operation of the rotary valve arrangement (i.e., two complete openings and closings of the ports 38) take place during each complete (360°) revolution of the disc 5 and of the shock tube 6. This conforms to the double-ended nature of passage 6 (both ends thereof being open), and to the two complete cycles of operation of the wave reactor, per complete or 360° revolution of disc 5, described in the above-mentioned 1918 and 1960 patents, and also referred to hereinabove.

The operation of the rotary valve arrangement at the center of the shock tube (i.e., the opening and closing action of this valve) can be suitably programmed with respect to the angle of rotation of the tube 6 by adjusting the fixed angular position or phase position of the stationary valve stem 35. The latter can be accomplished by angularly adjusting the position of mounting plate 37, after suitable manipulation of the bolts 46.

It is possible to employ the rotary valve arrangement 33, 35, etc. (at the center of the shock tube) for admitting charge gas to the center of the tube, rather than for withdrawing products therefrom. To do this, the connections at the outer ends of the conduits 20 and of the pipe 41 would be interchanged. In this case, the charge gas would be admitted to the center of the shock tube, and at a later time the product would be taken out at one end of the tube.

Refer again to FIG. 1. A pair of diametrically-opposite vent pipes 47 are sealed through the front cover plate 42, these pipes being centered on a horizontal diameter and being located near the outer periphery of the disc 5. Pipes 47 are welded each to a respective square mounting plate 48 which is in turn secured by bolts 49 to the front cover plate 42. The inner ends of the pipes 47 communicate with the space between the disc 5 and the front cover plate 42, while the outer ends of these pipes vent to the atmosphere. Pipes 47 thus serve to vent the front space inside the housing (which is formed by the two cover plates) to the atmosphere.

A pair of vent pipes, similar to pipes 47 but not shown in the drawings, are sealed through the rear cover plate 24, to vent the rear space inside the housing to the atmosphere.

The invention claimed is:

1. In a wave reactor, a disc-like rotor having therein a single straight cylindrical passage whose longitudinal axis extends transversely to the axis of rotation of the rotor and along a diameter of the disc, said rotor also having therein, adjacent its center, a bore extending from the exterior of said rotor to the interior of said passage; and a fixed elongated valve steam disposed in said bore, said stem having an outer configuration matching the configuration of said bore and the inner end face of said stem being arcuately concave to match the curvature of the wall of said passage at the inner end of said bore.

2. Structure according to claim 1, wherein said bore extends transversely to the longitudinal axis of said passage.

3. Structure according to claim 2, wherein said bore is circular, and wherein the center line of said bore and the axis of rotation of said rotor are substantially coincident.

4. Structure set forth in claim 1, wherein said stem has therein a port which is arranged to come into communication with said passage as said rotor rotates, relative to said stem, from a position in which said face is flush with the wall defining said passage.

5. Structure according to claim 4, wherein said port communicates with one end of a longitudinally-extending channel in said stem.

6. Structure according to claim 4, wherein said stem is substantially cylindrical in outer configuration, and wherein said port is located in the cylindrical surface of said stem, adjacent the inner end face thereof.

7. Structure defined in claim 6, wherein said port communicates with one end of a longitudinally-extending channel in said stem.

8. Structure set forth in claim 1, wherein said stem is substantially cylindrical in outer configuration, and wherein said stem has therein a pair of diametrically-opposite ports located in the cylindrical surface thereof; said ports being arranged to come into communication with said passage as said rotor rotates, relative to said stem, from a position in which said face is flush with the wall defining said passage 9. Structure according to claim 8, wherein said ports communicate with one end of a longitudinally-extending channel in said stem.

References Cited

UNITED STATES PATENTS

| | | | |
|---|---|---|---|
| 3,307,918 | 3/1967 | Bodmer et al. | 23—284 |
| 3,357,797 | 12/1967 | Hansel | 23—284 |

JAMES H. TAYMAN, JR., Primary Examiner

U.S. Cl. X.R.

23—252; 251—145, 146; 137—624.18, 624.13; 260—679